July 11, 1961 R. I. DEL CONTE 2,991,523
CORD STORAGE AND LENGTH ADJUSTING DEVICE
Filed Feb. 10, 1959
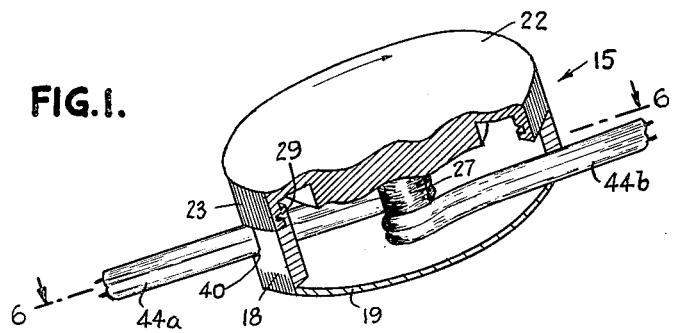
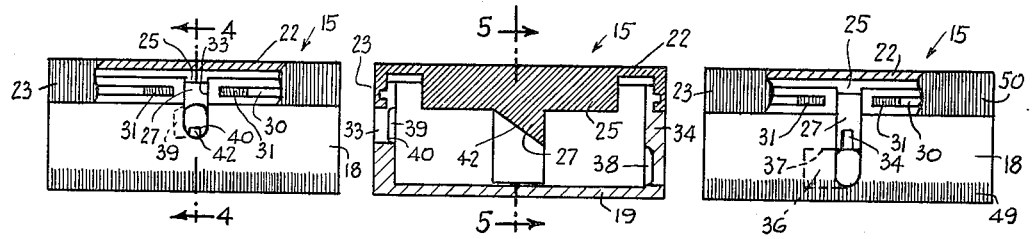
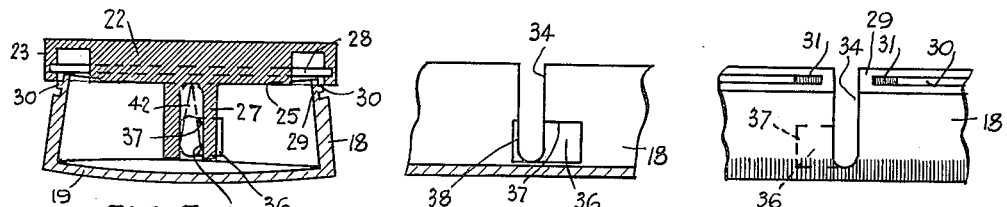
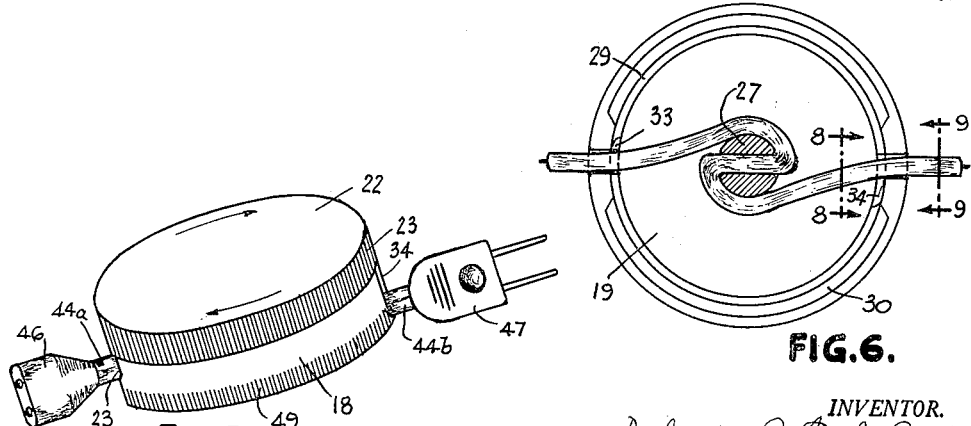
INVENTOR.
Robert I. Del Conte
BY
Piree Freeman
ATTORNEY.

United States Patent Office 2,991,523
Patented July 11, 1961

2,991,523
CORD STORAGE AND LENGTH ADJUSTING DEVICE
Robert I. Del Conte, New York, N.Y.
(239 Davis Ave., Bronx 65, N.Y.)
Filed Feb. 10, 1959, Ser. No. 792,299
4 Claims. (Cl. 24—71.2)

This invention relates to cord storage and length adjusting devices and, more particularly, to a device for conveniently storing and controlling the length of electrical extension cords of the type used for operating electrical equipment.

Ordinarily, excess electrical cords, wires, and the like present a safety hazard, as well as an untidy appearance in various types of domestic, industrial, and commercial installations. In many instances, electrical equipment is provided with outlet cords of fixed length which are either too short or too long for the particular location in which the equipment is to be used. In many other instances, extension cords are used and, because of the fixed length thereof, invariably are longer than necessary. It is, therefore, an object of the present invention to provide an electric cord storage and length adjusting device which may be conveniently used for supplying electrical energy to various pieces of electrical equipment at any desired location, all excess cord being neatly and safely disposed therewithin so as to overcome the aforementioned difficulties.

Another object of the present invention is to provide a storage and length adjusting device for flexible cables of all types, which can include rope, chain, electrical connecting wire, or the like which will effectively house a relatively large quantity of such flexible cable which may be elongated or shortened to suit particular purposes.

Still a further object of the present invention is to provide a cord storage and length adjusting device that includes a substantially cylindrical housing having a closure member releasably and rotatably mounted thereupon that may be conveniently removed and mounted whenever desired in a simple and efficient manner.

Still a further object of the present invention is to provide a cord storage and length adjusting device of the type described in which the cord is automatically neatly wound upon a centrally disposed spindle so as to provide for maximum capacity and ease of operation.

A more specific object of the present invention is to provide a flexible cable storage and length adjusting device in which the cable is stored within the housing in a pre-arranged manner to prevent jamming thereof during actual use, and which housing is completely enclosed on all sides to prevent interference with the operating parts by any foreign objects.

All of the foregoing and still further objects and advantages of this invention will become apparent from a study of the following specification, taken in connection with the accompanying drawing, wherein.

FIG. 1 is a perspective view, with parts broken away, of a flexible cable storage and length adjusting device made in accordance with the present invention in operative use.

FIG. 2 is a side elevational view, with parts broken away, of one side of the device shown in FIG. 1.

FIG. 3 is a view similar to FIG. 2, showing a diametrically opposite side of the unit.

FIG. 4 is a transverse cross-sectional view taken along line 4—4 of FIG. 2.

FIG. 5 is a transverse cross-sectional view taken along line 5—5 of FIG. 4, showing the main housing in a flexed position for engaging or disengaging the closure member.

FIG. 6 is a longitudinal cross-sectional view taken along line 6—6 of FIG. 1.

FIG. 7 is a perspective view of the device shown in FIG. 1, showing the flexible cable in a completely stored position.

FIG. 8 is an enlarged transverse cross-sectional view taken along line 8—8 of FIG. 6, with the cable removed.

FIG. 9 is an enlarged fragmentary transverse cross-sectional view taken along line 9—9 of FIG. 6, with the cable removed.

Referring now to the drawing, and more particularly to FIG. 1 thereof, a flexible cable storage and length adjusting device 15 made in accordance with the present invention is shown to include a main housing having an annular side wall 18 and a substantially flat base wall 19. A closure member is also provided and includes a substantially flat top wall 22 and an outwardly serrated annular flange 23. The inside surface of the top wall 22 is provided with a substantially centrally located boss 25 having a flat surface that lies in a plane substantially common to the plane of the free edge of the annular side wall or flange 23, for purposes hereinafter more fully described. In addition, the closure includes a central spindle 27 which projects into the interior of the housing, as is more clearly shown in FIGS. 4 and 5.

The inside surface of the annular side wall or flange 23 of the closure is provided with an annular groove 28 (FIG. 5) which rotatably receives rib segments 30 that extend radially outwardly of an upwardly extending portion 29 of the side wall 18 of the main housing. As is more clearly shown in FIGS. 2, 3, 6 and 9 of the drawing, each such segmental annular rib 30 has tapered terminal portions 31 that extend toward a pair of substantially diametrically oppositely positioned slots 33, 34, in the housing side wall 18. As the housing is preferably constructed from a sufficiently flexible material to enable it to bend, in the manner shown in FIG. 5, in response to radially inwardly directed pressure exerted at diametrically opposite sides thereof, the slots 33, 34 accommodate this distortion of the bottom or base wall 19 and enable the rib segments 30 to be snapped into engagement with the annular groove 28 in the closure member. The tapered extremities 31 of the rib segments provide sufficient clearance for this purpose on the diametrically opposite sides of the housing side wall, thus facilitating the assembly and disassembly of the circular housing and closure members in this manner.

It will be noted that one of the slots 34 is substantially longer than the other such slot 33, both such slots extending toward the base wall 19 of the housing and both such slots opening outwardly of the opposite side of the housing wall 18. The longer one of the slots 34 is provided with a sloped cutout 36 on the inner surface of the side wall 18 that defines a downwardly facing shoulder 37 which faces the base wall 19. The shorter slot 33 is provided with beveled portions 39 adjacent to its innermost extremity 40 which serve as guide means for one end 44a of a flexible cable that is directed therethrough. The shoulder 37 and associated beveled portion 38 of the longer slot 34 positions the opposite end of the flexible cable 44b therewithin, in the manner shown in FIG. 1. It will also be noted that the spindle 27 has a diametrically extending slot that is defined at its inner end by an oblique wall 42 that extends at an acute angle to the plane of the top wall 22 along a diameter of the closure member.

In actual use, the flexible cable, which may be an electric extension cord, is mounted within the assembly 15 in the following manner. The diametrically opposite sides of the side wall 18 of the housing, intermediate the slots 33, 34 are squeezed together to enable the closure member to be disengaged and removed therefrom. The midsection of the electric cord is then engaged with the slot 42 of the spindle 27 in the manner shown in FIG. 6, and each end 44a, 44b of the cord is placed within one of the slots 33, 34. The section of the cord adjacent to the innermost end of the oblique wall of the slot 42 is fed through the shorter slot 33, while the other length of cord 44b in proximity with the outermost end of the oblique wall of the slot 42 of the spindle is fed through the longer slot 34 in guiding engagement with the shoulder 37. As a result, rotation of the closure member in the direction of the arrow shown in FIG. 1 will cause the opposite ends of the electric cord to be wound upon the spindle 27 in two distinct series of convolutions, each adjacent to and parallel to each other. The shoulder 37 and associated beveled portion 38 of the long slot 34 effectively maintains the one end of the cord 44b adjacent to the base wall 19 of the housing, while the innermost extremity 40 of the shorter slot 33 retains the other end of the cable or cord 44a adjacent to the top wall 22. In this regard, the boss 25 serves to maintain the cord associated with the shorter slot 33 in proper convoluted relationship and prevents it from angling off into the space between the top wall 22 and the free edge of the side wall 23.

One end of the electric cord may be provided with a female plug 46, while the opposite end thereof is provided with a male plug 47. As a result, the male plug 47 may be inserted in any wall outlet, while the female plug 46 may be connected to the appliance being used. In the fully stored position indicated in FIG. 7, the unit is completely compact and the cord fully enclosed within the housing. However, by exerting an outward pull on each end of the cord, as much cord may be withdrawn as is needed at the particular time. On the other hand, by rotating the closure in the direction of the arrows shown in FIG. 7, through the assistance of the serrated flange 23 of the closure and the serrations 49 at the bottom of the housing, such extended cord may be wound back into the housing should such be desired.

While this invention has been described with particular reference to the construction shown in the drawing, it is to be understood that such is not to be construed as imparting limitations upon the invention, which is best defined by the claims appended hereto.

Having thus described my invention, what I claim as new and desire to secure by Letters Patent, is:

1. A flexible cable storage spool comprising, in combination, a shallow cylindrical housing having a base wall and an annular side wall, a closure member having a top wall and an annular side wall, disengageable track means rotatably securing said closure member side wall upon said side wall of said housing to define a central storage compartment, a spindle carried by said closure member projecting concentrically into the interior of said compartment, said spindle having means releasably retaining the mid-section of a length of flexible cable thereon, said side wall of said housing having a pair of circumferentially spaced apart slots communicating with the interior of said compartment, guide means extending from the slot walls along the inner side of the housing side wall for directing the opposite ends of the cable through said slots into winding engagement with axially spaced apart portions of said spindle, one end of said cable being directed into winding engagement with said spindle close to said base wall of said housing, and the opposite end of said cable being directed into winding engagement with said spindle close to said top wall of said closure member.

2. A flexible cable storage spool comprising, in combination, a shallow cylindrical housing having an annular side wall and a base wall at one end of said side wall, a closure member having an annular side wall and a flat top wall at one end of said side wall, track means disposed annularly on said side walls detachably securing the opposite end of said closure side wall rotatably to the opposite end of said housing side wall, a spindle integral with the center of said closure top wall projecting into the interior of said housing, a first cable guiding slot extending transversely of said housing side wall and terminating next to said base wall, a second cable guiding slot extending transversely of said housing side wall in spaced apart parallel relationship with said first slot and terminating substantially midway between the opposite ends of said housing side wall, both of said slots opening through said opposite end of said housing side wall and slidably receiving the opposite end of the flexible cable therethrough, and mounting means integral with said spindle securing a mid portion of the cable thereto, said track means comprising an annular rib integral with said housing side wall and extending radially outwardly from said opposite end thereof intermediate said slots, and said opposite end of said closure side wall defining an annular groove slidably receiving said rib therewithin, said housing base wall being flexible and said housing side walls being radially inwardly deflectable in the vicinity of said slots for insertion of said rib into said groove of said closure side wall.

3. A flexible cable storage spool as set forth in claim 2, wherein the inner surface of the housing side wall is beveled inwardly from the edges of said first slot to define a shoulder intermediate said opposite end of the housing side wall and said base wall, said shoulder providing means for guiding a flexible cable through said first slot intermediate said shoulder and said base wall.

4. A flexible cable storage spool as set forth in claim 2, wherein said mounting means on said spindle comprises a central slot extending diametrically through said spindle adjacent to the free end thereof, and the inner extremity of said slot is defined by an oblique wall defining an acute angle with said top wall, said oblique wall being disposed on said spindle substantially midway between the opposite extremities of said housing side wall.

References Cited in the file of this patent

UNITED STATES PATENTS

| | | |
|---|---|---|
| 1,386,918 | Westrup | Aug. 9, 1921 |
| 1,609,309 | Renz | Dec. 7, 1926 |
| 2,576,335 | Fanslow | Nov. 27, 1951 |
| 2,582,787 | Martin | Jan. 15, 1952 |
| 2,656,991 | Neely | Oct. 27, 1953 |
| 2,865,071 | Clemens | Dec. 23, 1958 |